United States Patent
Turner et al.

(10) Patent No.: US 7,568,041 B1
(45) Date of Patent: Jul. 28, 2009

(54) METHODS AND APPARATUS FOR SELECTING A MEDIA PROXY

(75) Inventors: Robert Turner, Wokingham (GB); Julian Mitchell, Maidenhead (GB); Neil Watts, Tilehurst (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 968 days.

(21) Appl. No.: 10/674,139

(22) Filed: Sep. 29, 2003

(51) Int. Cl.
 *G06F 15/16* (2006.01)
(52) U.S. Cl. .......................................... 709/231; 726/12
(58) Field of Classification Search ................. 709/231; 726/12
 See application file for complete search history.

(56) References Cited

U.S. PATENT DOCUMENTS

| | | | | |
|---|---|---|---|---|
| 6,930,983 B2 * | 8/2005 | Perkins et al. | ............... | 370/252 |
| 7,050,424 B2 * | 5/2006 | Cheng et al. | ............... | 370/352 |
| 7,065,043 B2 * | 6/2006 | Wu et al. | .................... | 370/229 |
| 7,085,829 B2 * | 8/2006 | Wu et al. | .................... | 709/223 |
| 7,313,145 B1 * | 12/2007 | Bradd et al. | ................. | 370/401 |
| 7,430,609 B2 * | 9/2008 | Brown et al. | ................. | 709/231 |
| 2002/0186685 A1 * | 12/2002 | O'Brien et al. | ............. | 370/352 |
| 2003/0233471 A1 * | 12/2003 | Mitchell et al. | ............. | 709/238 |
| 2004/0054805 A1 * | 3/2004 | Sen et al. | ..................... | 709/240 |
| 2008/0181202 A1 * | 7/2008 | O'Brien et al. | ............. | 370/352 |

* cited by examiner

*Primary Examiner*—Douglas B Blair
(74) *Attorney, Agent, or Firm*—Withrow & Terranova, P.L.L.C.

(57) ABSTRACT

In a packet based (typically IP) network, network address translation is frequently used to overcome the problem of dwindling address spaces. However, network address translation prevents the operation of many of the complex protocols used for transmission of media streams for example, data such as voice over IP or video over IP. Accordingly, media proxy devices are used to allow such data to traverse NAT boundaries. However, media proxy devices are expensive and therefore scarce and the selection of an optimum media proxy is important to obtain optimum functionality and cost effectiveness within the network. By providing a call agent in the network with a simple model of the network and providing information concerning optimum media proxies for different parts of the network, the problem of selecting an optimum media proxy during path set up is overcome.

17 Claims, 5 Drawing Sheets

METHODS AND APPARATUS FOR SELECTING A MEDIA PROXY

TECHNICAL FIELD

This invention relates to a method of selecting a media proxy for transmitting a media stream along a path. Media stream may include data such as voice-over-IP or video-over-IP data. The invention also related to a network model for representing a network which includes network address translators (NAT), to a call agent arranged to implement the selection method and to software arranged to cause a call agent to implement the method.

BACKGROUND OF THE INVENTION

In internet protocol (IP) based networks, each device on the network which is to communicate with another device must have a unique IP address. This requirement potentially places limits on the growth of IP networks since the supply of new, unused IP addresses is now becoming a scarce resource as a result of the phenomenal growth in use of IP based networks.

A typical and widely used solution to this problem is to isolate IP networks from public networks and to use a private IP numbering scheme within the network which may be replicated in many private networks around the world thus allowing the reuse of the private numbers. In order to allow such networks to communicate with other private networks across public networks, it is necessary to use a technique such as network address translation in which private IP addresses are mapped to public IP addresses so that IP packets can traverse public networks. Typically a small number of public IP addresses are used and mapping occurs between ports on private IP addresses within the private network and ports on the small number of public IP addresses used at the edges of the private network. Thus by reducing the requirements for public IP addresses, the problem of scarcity of IP addresses is significantly mitigated.

This type of technique has also found widespread application in the use of virtual private networks (VPNs) in which data is tunnelled over public networks in an encrypted tunnel. This usually involves some form of network address translation in the sense that the IP address and ports used for the packets forming the encrypted tunnel will not relate to the packets and ports contained within the tunnel other than by way of mappings within a NAT device.

However, many of the more complex protocols typically used for transmitting data such as voice over IP, video over IP, instant messaging and so on cannot traverse simple NAT devices since call set up and maintenance for these protocols requires significant "intelligence" in the receiving and transmission device. In the case of a path traversing a NAT device, the transmitting device cannot see the ultimate receiving device (which is replaced by the NAT at the external edge of the private network). One solution to this problem is to provide the NAT with the same intelligence (in relation to the relevant protocol) as the ultimate receiving device. The NAT must also be able to emulate the transmitting device so that the receiving device is able to interact with the relevant protocol correctly. Another solution is to add a device into the data path that is 'aware' of and can operate correctly through NATs. Such a device is typically called a 'media proxy'. This problem is described in detail in co-pending, co-assigned U.S. application Ser. No. 10/447,908 of 28 May 2003.

It will be appreciated that a media proxy is complex and therefore expensive. Accordingly media proxies are usually a relatively scarce resource within a network since they are too expensive to scatter liberally throughout a network on the off-chance that they will be used.

As described in more detail below, a call agent within the network will typically set up a path between two media endpoints which will include media streams.

Although the selection of an appropriate media proxy at first sight sounds reasonably straightforward, a more detailed analysis shows that selection of an optimal media proxy is a complex problem.

Firstly, the geographical location and input and output bandwidth of the media proxy must be considered. For example, there is little value in selecting a media proxy based in North America for a media stream between media endpoints which are based entirely in Europe since this would cause the traffic to be carried across the Atlantic in both directions on what would typically need to be high quality links (to ensure adequate bandwidth and latency performance). On the other hand, there is also little value in provisioning a media proxy local to both media endpoints if for some reason it is a particularly expensive media proxy to use, for example.

Secondly, there is presently no clearly defined arrangement for choosing a second best media proxy if the first proxy is unsuitable (for example because it is already being used to capacity and is therefore unavailable).

Thirdly, there is presently no mechanism for ensuring that paths between media endpoints belonging to the same enterprise (for example paths between two private networks at different office locations) use a media proxy which is local to the enterprise. This may mean that high charges are being incurred with a service provider to use a media proxy even though a local proxy within the enterprise's own network is available.

Thus with no provisioning model whatsoever, the problems outlined above occur frequently. Accordingly, attempts have been made to provide provisioning models to ensure that call agents use sensible choices of media proxies.

One solution is to provide a large number of media proxies at known locations so that it can be assumed that any particular media endpoint for example in a particular country may use a media proxy based in that country. However, this has a large provisioning cost (since there will be a large number of media proxies) and furthermore if there is no direct match with the location for a particular media endpoint and a media proxy, there is no fall back method for selecting a second best or next nearest media proxy resource.

Another approach is to use an auto discovery technique. Theoretically, this should be the ideal solution and would be achieved by having the source media endpoint test the network to determine the most suitable (typically the quickest) link to the destination endpoint. However, in practice, this requires a broadcast from a media endpoint to all media proxies with a time measurement. This uses network resources and requires the media endpoint to be relatively "intelligent". Furthermore, the broadcast signal is unlikely to put the same bandwidth stresses on the path which is being tested as the data ultimately will. Thus the path chosen using auto-discovery may fail or not perform as well as expected when real data is passed over it. This potential solution, is therefore presently impractical.

SUMMARY OF THE INVENTION

According to a first aspect of the invention there is provided a method of selecting a media proxy for transmitting a media stream along a path comprising, receiving a path setup request which specifies data endpoints for the path, traversing a nodular network model in a predetermined pattern dependent on the specified media endpoints, checking for a media proxy at each node traversed during traversal of the model, and selecting a media proxy found during traversal as the said proxy for the path using a predetermined selection policy.

By using a node topology to model the network, it is possible conveniently to represent suitable choices of media proxies by linking a media proxy to one or more node in the model. The media proxy is not physically linked to the particular node but is represented in the node for example by a linked list or other common database representation. This allows the call agent to select the appropriate media proxy by traversing the network model in a predetermined pattern. Suitable patterns are described in detail below. Generally though, the call agent may start at the first common node between the media endpoints and traverse higher up the network until a node linked to a media proxy is found. Another approach involves starting from a media endpoint and working back upwardly through the network until a linked media proxy is found.

In this way, a media proxy may easily be provisioned for a large portion of the network merely by linking the media proxy to the node which is common to all those nodes forming the desired part of the network.

In a second aspect, the invention provides a network model for representing a network having different areas, the model comprising a plurality of interconnected node nodes each defining an area boundary and a media proxy linked to at least one of the nodes.

In a preferred embodiment, each area is defined by a middlebox. A middlebox box may for example, represent a real device such as a NAT device, or a logical part of the network such as a point of constriction (a limited bandwidth link) or some other grouping.

In a third aspect, the invention provides a call agent arranged to setup a media path between data endpoints in networks separated by a boundary which blocks media streams and further arranged to read a model of the network formed as a list of nodes which has a media proxy linked to at least one of the nodes, to receive a path setup request which specifies media endpoints for the path, to read the model and traverse the network model in a predetermined pattern dependent on the specified media endpoints, to check for a linked proxy at each node traversed during traversal of the model, and to select a linked proxy found during traversal as the said proxy for the path.

In a fourth aspect, the invention provides a computer program adapted to execute on a call agent which is arranged to setup a media path between data endpoints in networks separated by a boundary which blocks media streams and during execution to cause the agent to read a model of the network formed as a list of nodes which has a proxy linked to at least one of the nodes, to receive a path setup request which specifies media endpoints for the path, to read the model and traverse the network model in a predetermined pattern dependent on the specified media endpoints, to check for a linked proxy at each node traversed during traversal of the model, and to select a linked proxy found during traversal as the said proxy for the path.

In a fifth aspect, the invention provides a call agent arranged to setup a path between media endpoints in networks separated by a boundary which blocks media streams and further arranged to read a model of the network formed as a list of nodes and a default global pool of media proxies associated with the model, to receive a path setup request which specifies media endpoints for the path, to read the model and traverse the network model in a predetermined pattern dependent on the specified media endpoints, to check for a linked proxy at each node traversed during traversal of the model, and to select a media proxy as the said proxy for the path from the default global pool if no proxies are found during traversal of the model.

Other aspects and features of the present invention will become apparent to those ordinarily skilled in the art upon review of the following description of specific embodiments of the invention in conjunction with the accompanying figures.

DESCRIPTION OF THE PREFERRED EMBODIMENTS

Figure 1:
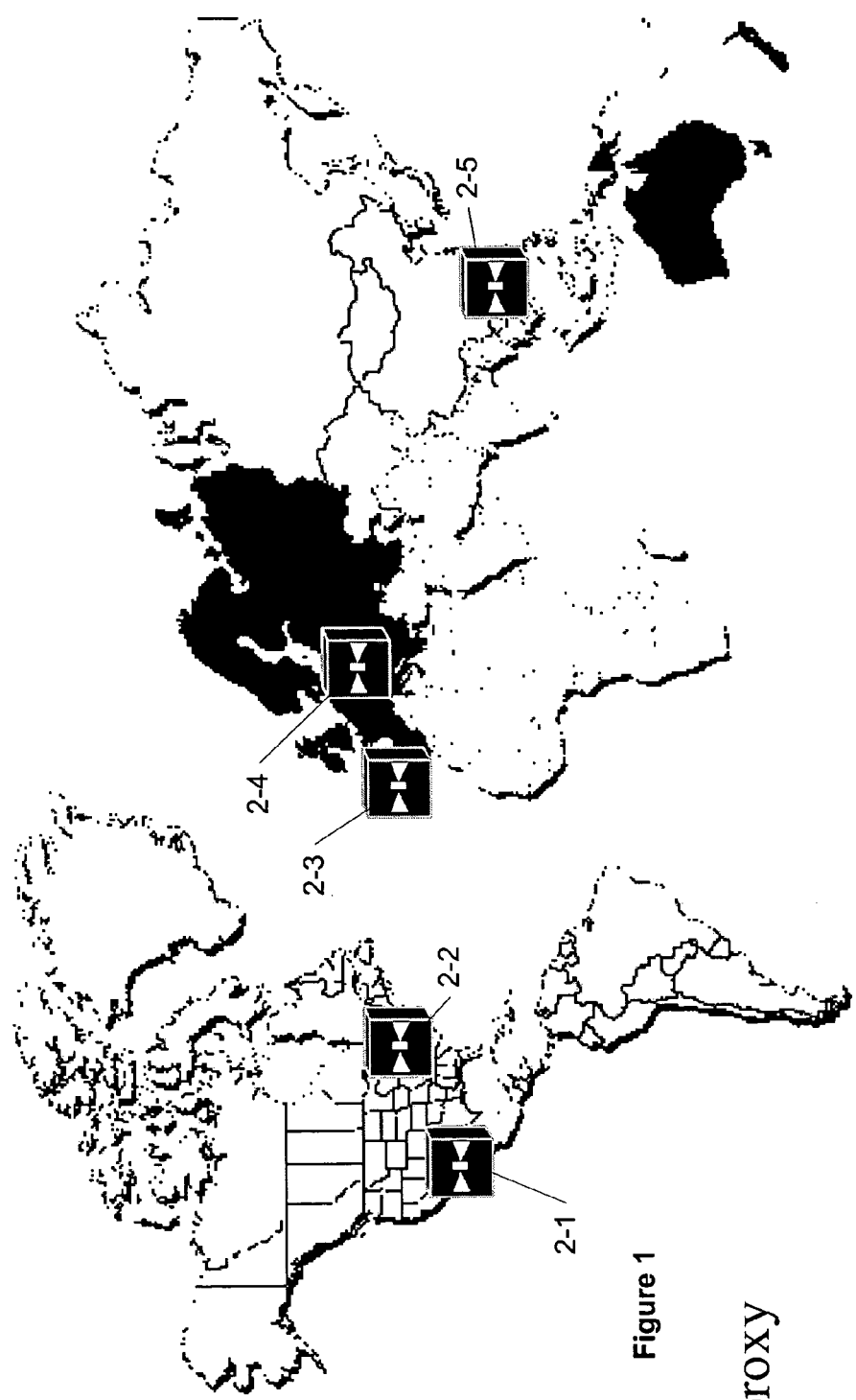
FIG. 1 is a schematic world map showing a plurality of geographically distributed media proxies.

As noted above, media proxies are scarce due to their complexity and cost. This is illustrated for example with the reference to FIG. 1, in which available media proxies 2-1 to 2-5 are shown scattered through North America, Europe and Asia. During call set up as described in more detail below, a call agent must choose one of the media proxies to allow media traffic such as voice over IP traffic to traverse NAT devices in the network. Different criteria may be chosen for selecting the most appropriate media path, such as the fastest media proxy, the nearest media proxy, least busy, the most reliable media proxy and/or the cheapest media proxy.

Figure 2:
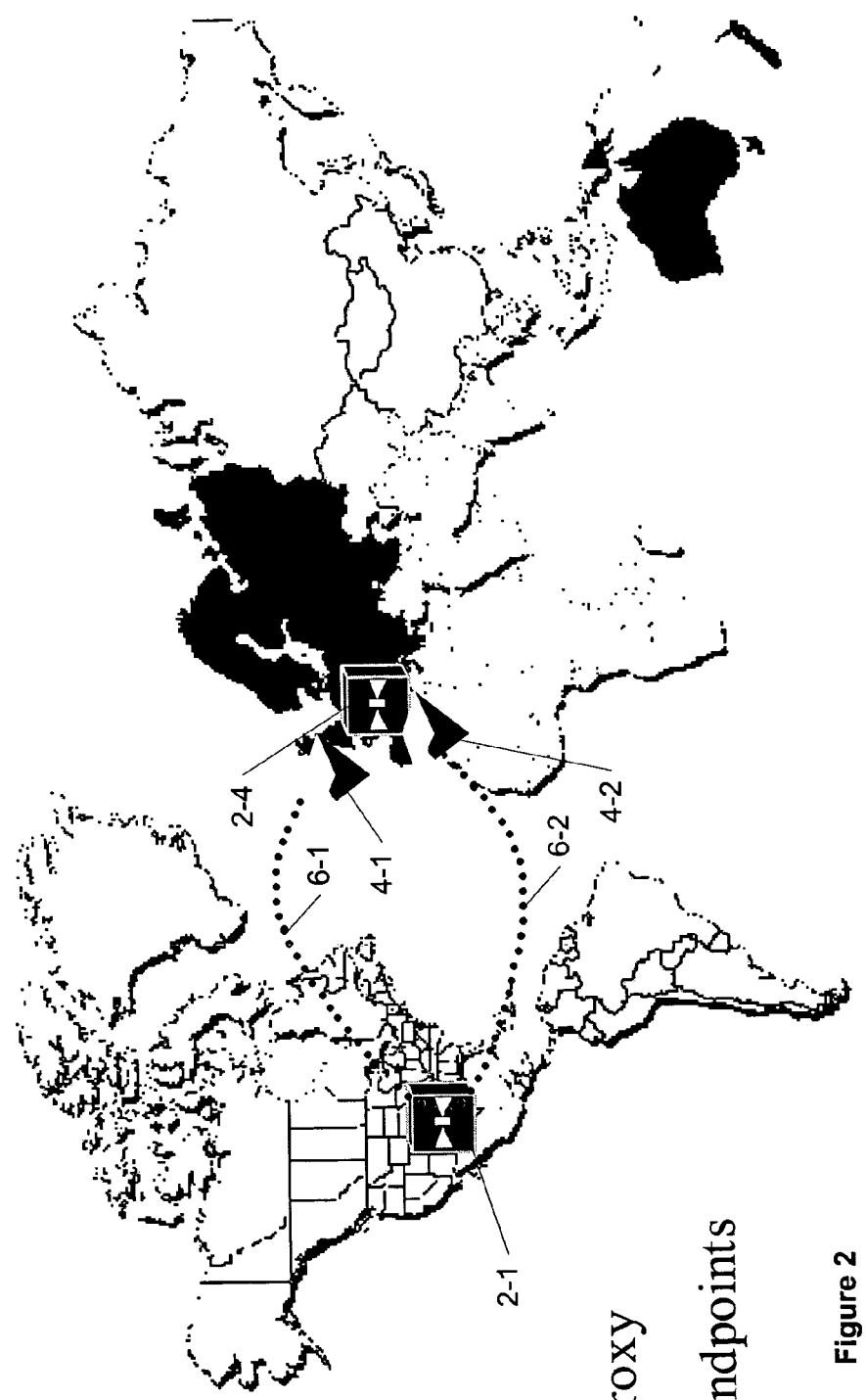
FIG. 2 is a schematic world map showing communication links between two media endpoints via a media proxy.

With reference to FIG. 2, one of the potential problems described above when no provisioning model is used, is illustrated. Two media endpoints 4-1 and 4-2 based in Europe need to communicate. Media proxy 2-4 is available locally. However, this is not apparent to the call agent setting up the call and instead the call agent selects media proxy 2-1 based in North America. This causes the data which is to be transferred between media endpoints 4-1 and 4-2 to be carried in two trans-Atlantic legs 6-1 and 6-2. Unless there is some overriding consideration which makes media proxy 2-1 the most suitable (for example all other media proxies are working at capacity), it is very unlikely that media proxy 2-1 will be the optimum selection for an intra Europe communication session. On the other hand, it may be that the North American media proxy is connected to much higher bandwidth links than the local media proxy so that the local European media proxy is always unsuitable for the particular traffic to be carried between the media endpoints 4-1 and 4-2. The problem as noted above, is how to cause the call agent to make the correct selections.

Figure 3:
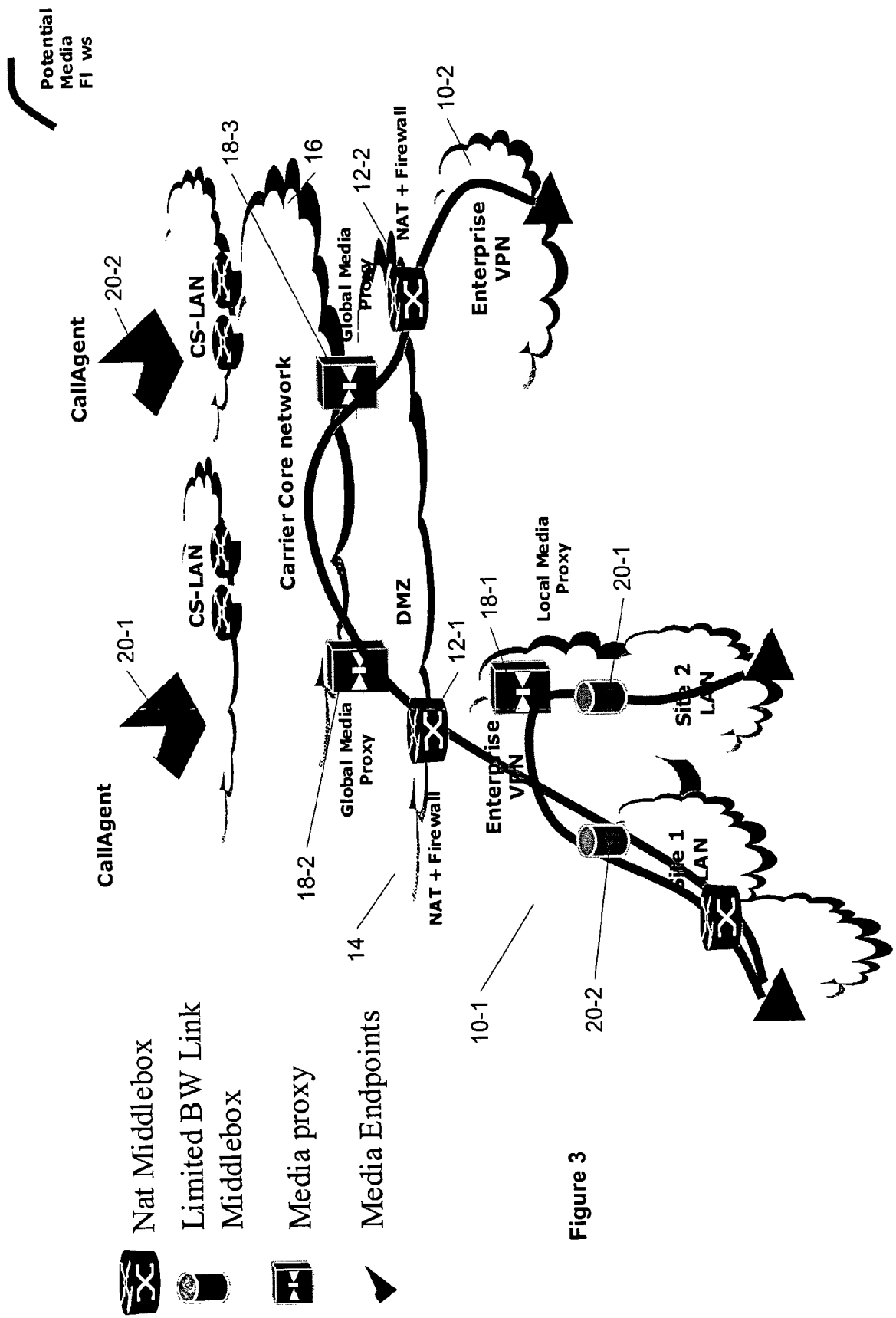
FIG. 3 is a schematic diagram of a typical IP network.

With reference to FIG. 3, a typical IP network designed for carrying media such as voice or video-over-IP includes two enterprise private networks 10-1 and 10-2 with respective NAT/firewall devices 12-1 and 12-2. The NAT devices 12-1 and 12-2 couple each of the private networks via a demilitarised zone (DMZ) 14 into a public carrier core network 16.

The network is also provided with three media proxies namely a local media proxy 18-1 which serves private network 10-1 and two global media proxies 18-2 and 18-3 which are located in the DMZ 14 and which can serve the whole enterprise.

Call set up and routing of paths through the public and private networks is controlled by call agents 20-1 and 20-2.

Such a network may be modelled using the so-called middlebox topology. Using this technique, devices such as NAT devices are replaced by a "black box" and similarly, limited bandwidth middleboxes 20-1 and 20-2 may be used to denote links having limited bandwidth. This allows the problem of routing paths within a network for example by a call agent or call processor, to be broken down into a simpler problem, since detail which is irrelevant to the routing problem is removed.

Figure 4:
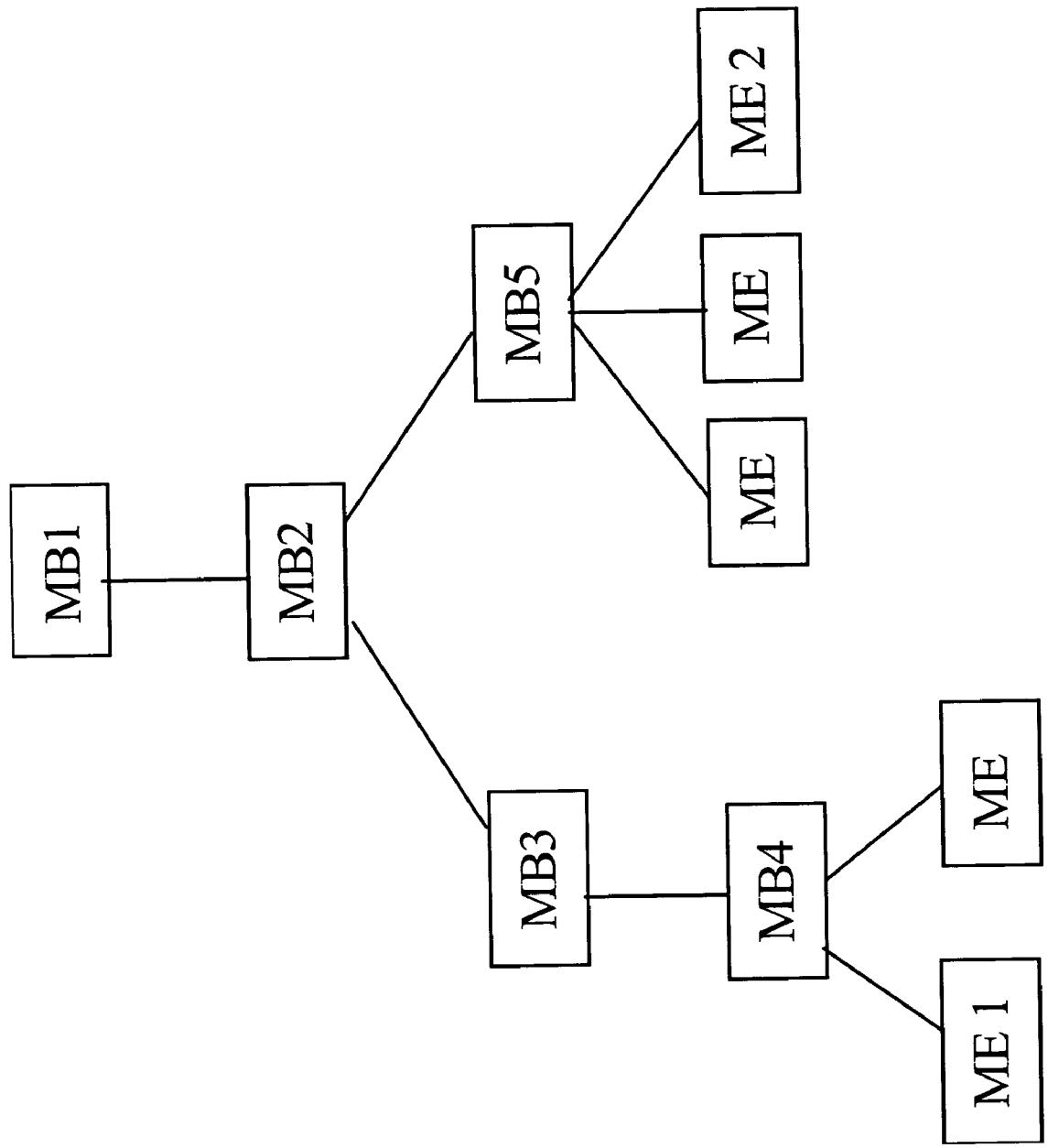
FIG. 4 is a middlebox representation of a network.

Accordingly, a network similar to that of FIG. 3 may be modelled in the way shown in FIG. 4. In this example, middleboxes MB1 to MB5 may represent NAT devices limited bandwidth links, or other network groupings or a combination of these. Media endpoints ME1 to ME5 are not usually shown in middlebox topology but in this case are shown behind their respective middlebox NATs or bandwidth limited links. However, it will be noted that this topology provides no information about media proxies and thus is of no help in solving the problem of selecting an optimum media proxy for a particular path.

Figure 5:
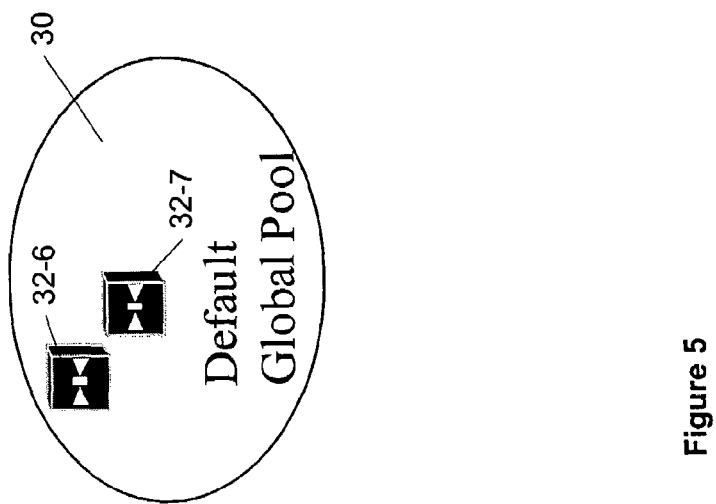
FIG. 5 is an enhanced middlebox representation of a network in accordance with the invention.
Figure 5:
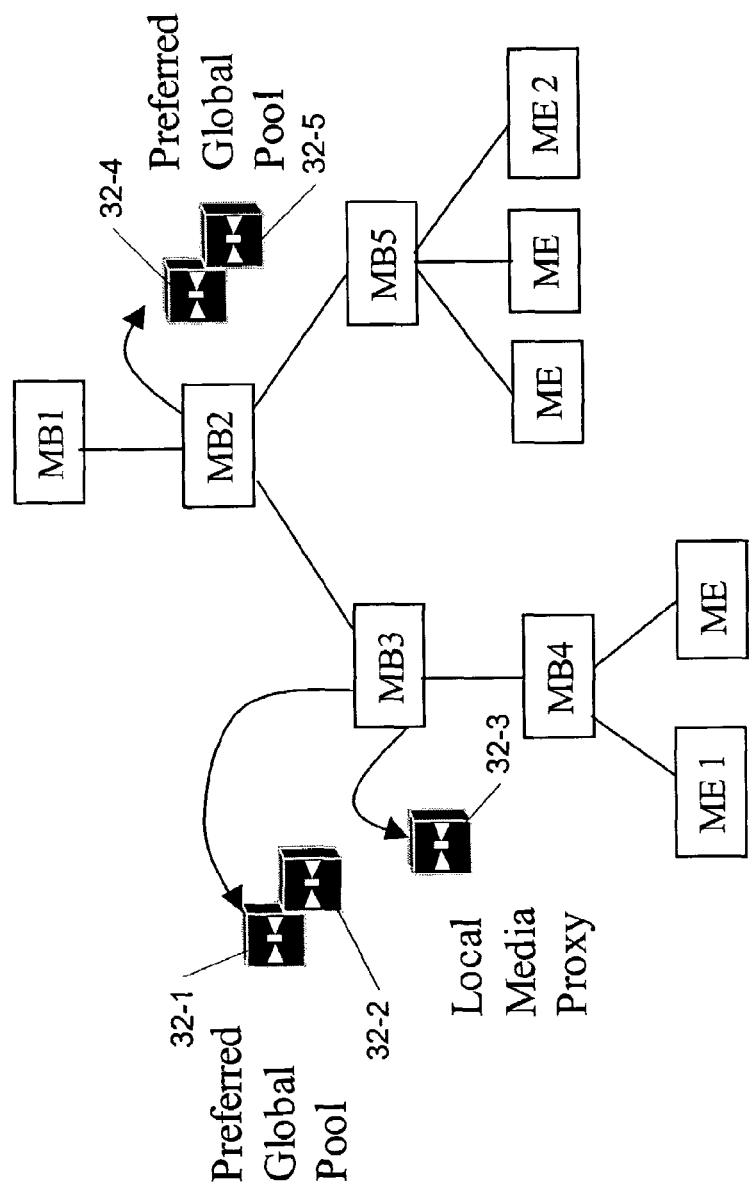

However, by modifying the topology in the way shown in FIG. 5, it is possible to provide information to allow a call agent to select a suitable media proxy.

Thus in FIG. 3, call agents 20-1 and 20-2 may contain or at least have access to a model of the network conceptually in the form shown in FIG. 5. In practice, the topology would probably be held in some form of database which allows tree traversal and thus would in effect be constructed in the form of data held in storage means and operated upon by computer processing means. Thus a practical implementation of the invention is likely to take the form of additional software within a call agent.

Returning to FIG. 5, it will be noted that several media proxies have been "linked" to middleboxes 3 and 2 (MB3, MB2). The link is in the form of a reference to a representation of the media proxy and is used in the way described below to allow a call agent to become aware that there is an optimum media proxy to use for that part of the network.

Accordingly, during call set up, call agent 20-1 or 20-2 traverses a model of the form shown in FIG. 5 (which, of course, would be adapted to represent the actual network configuration associated with the call agent). The call agent traverses the model until a node is reached in the middlebox topology which includes a link to a media proxy. At that point, the call agent determines whether the media proxy is available (for example it may be out of service or operating at full capacity). If the media proxy is available, then this media proxy is selected for the path. If the media proxy is not available, then if more than one media proxy is linked to the particular node in the middlebox topology then one of the alternative media proxies is used and the process continued until a media proxy is selected which is available. If no media proxies are available from a particular node, then traversal continues until ultimately a media proxy is selected from the default global pool 30.

Several different traversal strategies are possible. One strategy is to find the node which is common between desired media endpoints and which is lowest in the tree hierarchy. For example, if it were desired to set up a path between media endpoint 1 and media endpoint 2, it will be seen that middlebox 2 is common between the two desired media endpoints. Thus the call agent may look first at that node to determine whether any media proxies are linked. It will be noted that two media proxies are linked to this middlebox and assuming that one or other of them is available, that media proxy will be provisioned for the path. If neither of the middleboxes are available, the call agent will continue to traverse the tree upwardly until it reaches middlebox 1 at which point it will be determined that no media proxies are available and a media proxy from the default global pool 30 will be used instead.

As an alternative example, it may be desired to communicate between media endpoints 1 and 3. The first common node between these media endpoints is middlebox 4 which has no media proxies linked to it. Thus traversal continues to middlebox 3. This has three media proxies linked to it. Two of these are global media proxies 32-1 and 32-2 and the third is designated as a local media proxy 32-3. In this instance, the call agent determines that media endpoints 1 and 3 are indeed local to the network and the local media proxy 32-3 may be used. Typically this will be the preferable media proxy since it is on the local network and is unlikely to be geographically remote from the media endpoints (whatever the reason, at the time the model was set up, this media proxy was designated as the preferred media proxy for local connections). Thus assuming media proxy 32-3 is available, this media proxy will be selected. If it is not available, the less preferred global media proxies 32-1 and 32-2 will be used instead. It is possible, for example that these are less preferred because they are geographically remote from the network containing media endpoints 1 and media endpoints 3 but nevertheless are suitable because they have sufficiently high bandwidth links or are sufficiently cheap to use as a reasonable alternative to the local media proxy 32-3. These sorts of economic choices are made at the time the model is set up and may be adjusted later. A key point is that the call agent does not need to know this information, it simply uses a tree traversal and ordered list algorithm to select an optimum media proxy.

An alternative traversal strategy is the so-called "master leg-up" strategy in which traversal starts at one end of a desired media call and traversal continues until a middlebox linked to a useable media proxy is found. In this case, the middlebox link will typically be nearer one end of the media path than using the previous strategy.

For example, and with reference to FIG. 5, assume that ME1 wishes to set up a media path to ME2. Initially, the call agent (not shown) traverses to MB4 and finds no media proxies associated with that middlebox. Traversal therefore continues to MB3 which has a local media proxy 32-3 associated with it. However, that media proxy is ignored because ME2 is not within an area local to MB3. The call agent therefore attempts to select one of the media proxies 32-1 or 32-2. If for any reason, these are not available, traversal continues to middlebox MB2 which also has two media proxies 32-4, 32-5 associated with it. If media proxies 32-4 and 32-5 are not available, one of the proxies 32-6 or 32-7 from the default global pool 30 would be used instead.

It will be appreciated therefore that at relatively small overhead, call agents may be made to make good quality choices concerning media proxies despite the selection being a complex problem as discussed above. This is achieved by determining the optimum media proxies for particular areas of the network once and building this into a network model and then arranging for the network model to be easy for a call agent to process in order to make selections at the time of call set up.

For the purposes of this application, a call agent should be considered to be synonymous with an IP call server, call processor or a SIP proxy-type device and equivalent devices. Similarly, the concepts described herein may be generalised from IP networks to other packet based networks having devices equivalent to network address translation devices which adjust packet addressing information and thereby require enhanced NAT type devices for the transport of media which uses relatively complex protocols. Furthermore, although the detailed discussion above has concerned a middlebox topology, it will be appreciated that the technique may this may be generalised to cover all node-based models of networks.

The invention claimed is:

1. A method of selecting a media proxy for transmitting a media stream along a path comprising,
    (a) receiving a path setup request which specifies data endpoints for the path,
    (b) traversing a nodular network model in a predetermined pattern dependent on the specified media endpoints,
    (c) checking for a list of media proxies at each node traversed during traversal of the nodular network model, wherein a plurality of media proxies is linked to at least one of the nodes in the nodular network model in a list,
    (d) determining the availability of at least one of the media proxies;
    (e) selecting a media proxy from the list found during traversal of the nodular network model as the media proxy for the path using a predetermined selection policy.

2. A method according to claim 1, wherein the list orders the media proxies linked to the node by preference and wherein the method further includes selecting the next proxy in the ordered list if the selected proxy is unavailable.

3. A method according to claim 1 wherein the list includes a pool of proxies of equal preference and wherein the method further includes selecting a proxy in the pool of proxies using a predetermined strategy.

4. A method according to claim 3, wherein the predetermined strategy is selected from a group containing random and round-robin strategies.

5. A method according to claim 1, wherein the media proxy includes a local designation which indicates whether the media proxy should be used only for paths between endpoints in a particular subset of the whole network, and wherein the step of selecting the media proxy includes checking the local designation and if the media proxy is designated as local, determining if the specified media endpoints fall within the particular subset of the whole network.

6. A method according to claim 1, wherein the path setup request is received by a call agent.

7. A method according to claim 6, wherein the nodular network model is stored within the call agent.

8. A method according to claim 7, wherein the nodular network model traversal and selection steps are carried out by the call agent.

9. A method according to claim 6, wherein the nodular network model is stored separately from the call agent.

10. A method according to claim 9, wherein the nodular network model traversal and selection steps are carried out by the call agent.

11. A method according to claim 1, wherein the nodular network model is stored as a tree hierarchy.

12. A call agent arranged to setup a media path between data endpoints in networks separated by network address translation and further arranged to read a model of the network formed as a plurality of nodes which has a plurality of media proxies linked to at least one node of the plurality of nodes in a list, to receive a path setup request which specifies media endpoints for the media path, to read the model and traverse the model in a predetermined pattern dependent on the specified media endpoints, to check for a list of media proxies at each node traversed during traversal of the model, determine the availability of the media proxy and to select a media proxy from the list found during traversal of the model as the media proxy for the media path.

13. A call agent according to claim 12, wherein the plurality of media proxies are linked to the at least one node in a list ordered by preference and wherein the call agent is further arranged to select the next proxy in the ordered list if the selected media proxy is unavailable.

14. A call agent according to claim 12 wherein the plurality of media proxies are linked to a node in a list forming a pool of proxies of equal preference and wherein the call agent is further arranged to determine the availability of the plurality of media proxies and to select a proxy in the pool of proxies according to a predetermined strategy.

15. A call agent according to claim 12, wherein each media proxy includes a local designation which indicates whether the media proxy should be used only for paths between endpoints in a particular subset of the whole network, and wherein the call agent is arranged to check the local designation during media proxy selection and if the media proxy is designated as local, to determine if the specified media endpoints fall within the particular subset of the whole network.

16. A computer program embodied in a memory and adapted to execute on a processor in a call agent which is arranged to setup a media path between data endpoints in networks separated by network address translation and during execution to cause the call agent to read a model of a network formed as a plurality of nodes which has a plurality of media proxies linked to at least one node of the plurality of nodes in a list, to receive a path setup request which specifies media endpoints for the media path, to read the model and traverse the model in a predetermined pattern dependent on the specified media endpoints, to check for a list of media proxies at each node traversed during traversal of the model, to determine the availability for at least one media proxy and to select a media proxy from the list found during traversal of the model as the media proxy for the media path.

17. A call agent arranged to setup a media path between media endpoints in networks separated by a boundary which blocks media streams and further arranged to read a model of a network formed as a list of nodes and a default global pool of media proxies which are arranged to permit traversal of the boundary by the media stream and which are associated in a list with the model, to receive a media path setup request which specifies the media endpoints for a path, to read the model and traverse the model in a predetermined pattern dependent on the specified media endpoints, to check for a linked media proxy at each node traversed during traversal of the model, and to select a media proxy as the media proxy for the path from the default global pool if no proxies are found during traversal of the model.

* * * * *